Aug. 20, 1935.   N. H. GILMAN   2,011,855

SPEED REDUCING MECHANISM FOR DRIVING AIRPLANE PROPELLERS

Filed March 17, 1933

Inventor
Norman H. Gilman

By Blackmore, Spencer & Flint
Attorneys

Patented Aug. 20, 1935

2,011,855

UNITED STATES PATENT OFFICE 2,011,855

SPEED REDUCING MECHANISM FOR DRIVING AIRPLANE PROPELLERS

Norman H. Gilman, Indianapolis, Ind., assignor to General Motors Corporation, Detroit, Mich., a corporation of Delaware Application March 17, 1933, Serial No. 661,326

1 Claim. (Cl. 74—389)

My invention relates to speed reducing gearing used in association with an internal combustion engine designed, especially, for driving airplanes, although the same is equally capable of use in any service wherein a shaft is to be driven at a speed less than that of the crank shaft of an engine; and the object of my invention is to provide improved speed reduction gearing of the internal gear type wherein the internally toothed gear which drives the propeller shaft is better and more effectively supported and held in position relative to the crank shaft gear than has heretofore been the case, to provide for the driving of the valve mechanism of the engine and various auxiliary devices thereof from said internal gear, and to provide other improvements in and associated with such speed reducing gearing as will hereinafter and at length appear.

The drawing submitted herewith illustrates the preferred form of my invention, and the features wherein the same consists are particularly pointed out in the concluding claim.

Figure 1:
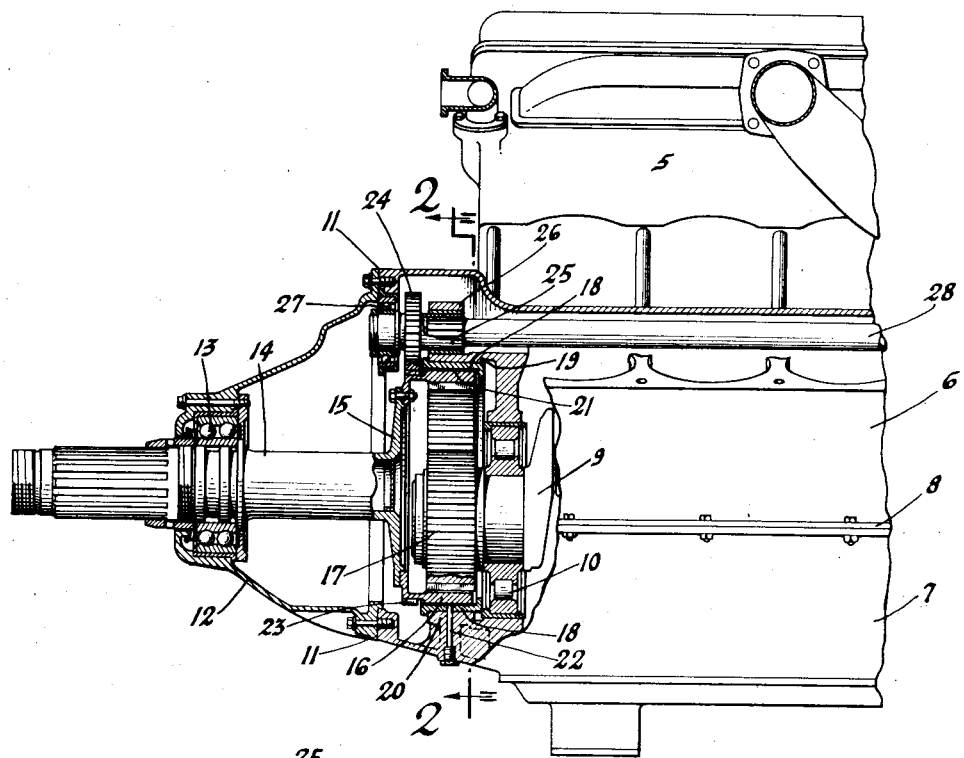
Figure 1 is a fragmentary sectional view showing the front end of a twelve cylinder engine equipped with my improved speed reducing gearing.
Figure 2:
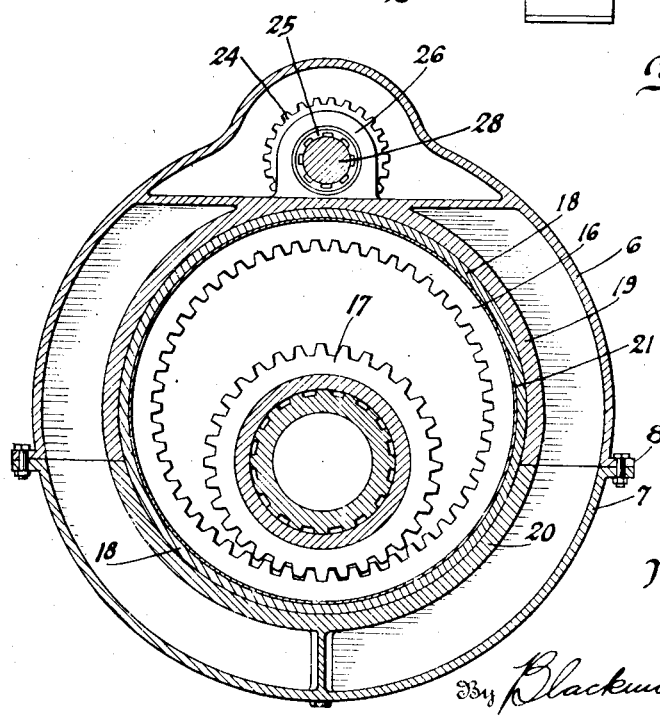
Figure 2 is a view showing a section upon a vertical transverse plane indicated by the line 2—2, Figure 1.

The engine contemplated is a twelve cylinder engine the cylinders of which are arranged in two blocks of six cylinders each arranged at an angle of 60° to one another, the farther of the two blocks being indicated by the numeral 5; and both blocks are supported from inclined seats upon the upper section 6 of the crank case as is usual in V-type multiple cylinder engines. The lower section of the crank case is indicated by the numeral 7, and the two sections are secured together along a joint 8 in the plane of the crank shaft 9, the bearings for which are supported in semi-circular seats provided in transverse webs in the crank case sections. The bearing for the front end of the crank shaft is indicated by the numeral 10, and the front ends of the two crank case sections lie in a single vertical plane indicated by the numeral 11.

Secured to the ends of the crank case sections along the plane 11 is a housing 12 having a bearing at its front end 13 for a propeller shaft 14 arranged within the housing, and which carries a propeller, not shown. The rear end of this shaft has a flange 15, and the numeral 16 designates an annular internal gear secured to said flange. The crank shaft 9 has a gear 17 upon its front end which meshes with the internal teeth of the gear 16 to thereby drive the same and the shaft 14 and the propeller carried thereby as will be understood.

The periphery of the gear 16 is cylindrical in form and rotates within and is supported by a continuous single piece bearing ring 18, which in turn is supported in a fixed position within the crank case. In the form of my invention illustrated this bearing ring is clamped between two seats 19, 20 formed one in each of the crank case sections, and which seats are located within the crank case and are associated with the front transverse webs which support the front end of the crank shaft; said seats thus providing a continuous circular support for the bearing ring and within which said ring is held. The bearing ring, therefore, provides a continuous and uninterrupted support for the internal gear 16 throughout its entire circumference, and a support as close as possible to the internal teeth thereof.

This form of support locates the fixed abutment (the bearing ring and the seats 19, 20) as close as possible to the origin of the force (due to engagement between the teeth of the gears 17, 16) acting upon the internal gear, and which force is transmitted to the bearing ring and resisted thereby; and provides a more rigid support, and maintains a more definite and permanent relation between the gears 16, 17 than is provided by ball, roller or other types of bearings heretofore used in similar relations. The two gears may therefore be formed with reference to and installed with a minimum of clearance, as the bearing ring maintains the parts always in their definite position of initial adjustment. The annular gear and the bearing ring being both of steel it follows that they expand (due to heating of the engine) and contract at the same rate, and that the clearance initially provided for between the teeth will be the same at all temperatures. The bearing ring as above appears is commonly made of steel, and the same is shown as provided with a thin layer 21 of plastic bronze, Babbitt metal, or equivalent anti-friction bearing metal alloy which is integrally united therewith, as by being fused thereto, this being to secure a better bearing between the parts as will be appreciated. The bearing ring is clamped between the seats 19, 20 within the crank case sections 6, 7 and is prevented from rotating by a pin 22 the end of which enters a hole in the ring. The bearing 10 for the crank shaft is as stated supported in semi-circular seats provided in transverse webs in the crank case sections 6, 7, and the seats 19, 20 which support the bearing ring 18 are as shown formed integrally with said webs. This feature provides reduction gearing wherein alignment of and the spacing between the axes of rotation of the crank shaft and of the bearing ring is permanently maintained, and cannot be affected by disassembling and reassembling the parts, the housing 12 being entirely independent of the said bearings; and provides further a speed reducing device wherein the gear 16 and pinion 17 may be so designed as to secure minimum back lash between their teeth and wherein proper meshing and tooth action is maintained when the device is in operation.

The internal gear 16 is provided also with external teeth 23 which mesh with and drive a pinion 24 upon a short internally splined shaft 25, the ends of which are supported in bearings located inside the upper crank case section 6; one bearing 26 extending upward from the upper seat 19 for the bearing ring, and the other 27 being supported beneath the central part of the top wall of said section. The short shaft 25 has a splined driving connection with a long shaft 28 which extends lengthwise of the crank case and is arranged just below the top wall thereof, and to the rear end of the engine where it acts to drive the valve mechanism of the engine, the electrical igniting apparatus, a centrifugal supercharging pump, the oil pumps and such like auxiliary apparatus not herein disclosed in detail. This shaft it will be appreciated lies between the lower ends of the two cylinder blocks and inside the crank case. Its speed is immaterial so long as the ratio between the crank shaft 9 and the cam shafts which operate the engine valves is two-to-one, so as to secure the operation of the engine upon a four stroke cycle.

Having thus described and explained my invention I claim and desire to secure by Letters Patent:

In speed reducing gearing of the class described and in combination with a crank case, and a crank shaft rotatable in bearings within said case; a housing secured to the front end of said crank case and having a bearing for a propeller shaft; a propeller shaft extending through said housing and rotatable in said bearing; an annular internal gear secured to the inner end of said propeller shaft to drive the same; an integral single piece bearing ring surrounding and in contact with said internal gear to thereby provide direct support therefor; a support for said bearing ring, the same being located within said crank case; a short shaft supported in bearings within the upper part of said crank case; a pinion upon said shaft to drive the same; external teeth upon said internal gear and which teeth mesh with said pinion; a long shaft within the upper part of said crank case and extending longitudinally thereof, and the front end of which has a splined driving connection with said short shaft; and a gear carried by said crank shaft and in mesh with the teeth of said internal gear to thereby drive said propeller shaft.

NORMAN H. GILMAN.